US009707932B2

(12) United States Patent
An et al.

(10) Patent No.: US 9,707,932 B2
(45) Date of Patent: Jul. 18, 2017

(54) WIPER BLADE

(71) Applicant: KBWS Corporation, Daegu (KR)

(72) Inventors: Jae Hyuck An, Daegu (KR); Woo Sung Lee, Daegu (KR)

(73) Assignee: KBWS Corporation (KR)

( * ) Notice: Subject to any disclaimer, the term of this patent is extended or adjusted under 35 U.S.C. 154(b) by 384 days.

(21) Appl. No.: 14/465,955

(22) Filed: Aug. 22, 2014

(65) Prior Publication Data

US 2015/0258964 A1    Sep. 17, 2015

(30) Foreign Application Priority Data

Mar. 12, 2014    (KR) .................. 10-2014-0028903

(51) Int. Cl.
*B60S 1/38*    (2006.01)

(52) U.S. Cl.
CPC ..... *B60S 1/3801* (2013.01); *B60S 2001/3813* (2013.01); *B60S 2001/3815* (2013.01); *B60S 2001/3843* (2013.01)

(58) Field of Classification Search
CPC ................ B60S 1/38; B60S 2001/3813; B60S 2001/3815; B60S 1/3801
USPC ......................... 15/250.44, 250.46, 250.361
See application file for complete search history.

(56) References Cited

U.S. PATENT DOCUMENTS

| 4,953,251 A | 9/1990 | Chow |
| 2002/0133895 A1 | 9/2002 | Herinckx et al. |
| 2011/0131750 A1 | 6/2011 | Kwon et al. |
| 2013/0227808 A1 | 9/2013 | Lee et al. |
| 2014/0053361 A1 | 2/2014 | Amano |

FOREIGN PATENT DOCUMENTS

| FR | 2751597 | 1/1998 |
| GB | 2174627 | 11/1986 |
| JP | 63148559 | 9/1988 |
| JP | 05193452 | 8/1993 |
| JP | 2003512248 | 4/2003 |
| JP | 2003535752 | 12/2003 |
| JP | 2011116365 | 6/2011 |
| JP | 2013173437 | 9/2013 |
| WO | 2013080694 | 6/2013 |

OTHER PUBLICATIONS

Corresponding Notification of Reasons for Refusal issued by the JPO on May 19, 2015.

*Primary Examiner* — Gary Graham
(74) *Attorney, Agent, or Firm* — The Belles Group, P.C.

(57) ABSTRACT

Disclosed is a wiper blade that includes: a wiper strip which wipes a wiping surface; at least one pair of yoke levers which supports the wiper strip; a pair of auxiliary levers which is relatively rotatably coupled to the at least one pair of yoke levers respectively; and a main lever which is relatively rotatably coupled to a pair of the auxiliary levers and is connected to a wiper arm. A pair of the auxiliary levers includes a hinge protrusion which protrudes outwardly therefrom in a width direction thereof and a hinge shaft which protrudes inwardly. The main lever includes a first hinge recess which is formed on an inner side wall of an end thereof and to which the hinge protrusion is coupled and includes a second hinge recess which is formed in the center in a width direction of the main lever and to which the hinge shaft is coupled.

8 Claims, 7 Drawing Sheets

WIPER BLADE

CROSS REFERENCE TO RELATED APPLICATIONS

Priority is claimed under 35 U.S.C. §119 to Korean Patent Application No. 10-2014-0028903, filed Mar. 12, 2014, the disclosure of which is incorporated herein by reference in its entirety.

FIELD OF THE INVENTION

The present invention relates to a wiper blade, and more particularly to a wiper blade for a vehicle.

BACKGROUND OF THE INVENTION

In general, a wiper blade removes impurities, snow, rain or the like when driving and prevents a driver's front sight from being deteriorated. In the existing wiper blade, as a motor drives a link apparatus connected to a wiper arm, the wiper blade performs a repetitive reciprocating action in a fan shape.

In the existing wiper blade, a pair of metallic backing plates is coupled to a rubber-made wiper strip, and the backing plate is supported by a plurality of yoke members. The yoke members are connected with each other by means of a plurality of levers.

Here, with regard to the existing wiper blade, through use of a pin or a rivet, the yoke member and an auxiliary lever are rotatably coupled to each other, and auxiliary levers are rotatably coupled to each other. A spacer and the like which have a small friction coefficient is coupled to the coupling portion in order to reduce frictional resistance. Therefore, the number of parts constituting one wiper blade is as many as 20 and at least 15. Since the conventional wiper blade uses a metallic main lever and a metallic sub lever, the wiper blade is heavy.

The wiper blade which has a lot of parts and large weight gives a load to the wiper arm as well as a glass surface of the vehicle when the wiper blade is installed in the vehicle. As a result, breakdown may occur and the life span of the product may be shortened. Accordingly, a light wiper blade having an excellent assemblability is required to be developed.

SUMMARY OF THE INVENTION

One embodiment is a wiper blade that includes: a wiper strip which wipes a wiping surface; at least one pair of yoke levers which supports the wiper strip; a pair of auxiliary levers which is relatively rotatably coupled to the at least one pair of the yoke levers respectively; and a main lever which is relatively rotatably coupled to a pair of the auxiliary levers and is connected to a wiper arm. A pair of the auxiliary levers includes a hinge protrusion which protrudes outwardly therefrom in a width direction thereof and a hinge shaft which protrudes inwardly. The main lever includes a first hinge recess which is formed on an inner side wall of an end thereof and to which the hinge protrusion is coupled and includes a second hinge recess which is formed in the center in a width direction of the main lever and to which the hinge shaft is coupled.

The hinge protrusion 33 may be tapered such that degree of protrusion the hinge protrusion 33 from the auxiliary lever 30 gradually increases or decreases.

When the hinge protrusion 33 is viewed in a direction in which traveling wind blows to the wiper blade, the hinge protrusion 33 may include a hemispheric upper protrusion 33a and a hemispheric lower protrusion 33b. A degree of protrusion of the upper protrusion 33a gradually may decrease toward the top from the bottom thereof.

The main lever 40 may further include a guide part 44a which guides such that the hinge protrusion 33 is coupled to the first hinge recess 44 in a sliding manner. The first hinge recess 44 may include an upper catching portion 44b by which the upper protrusion 33a is caught and a lower catching portion 44c by which the lower protrusion 33b is caught.

The main lever 40 may further include a protrusion fitting portion 45 formed to protrude downwardly from an inner ceiling. The auxiliary lever 30 may further include a receiving hole 38 which is formed in the upper portion thereof and by which the protrusion fitting portion 45 is caught.

The protrusion fitting portion 45 may include a protrusion formed toward the receiving hole 38 and a concave part toward the receiving hole 38. The second hinge recess 46 may be formed in the concave part of the protrusion fitting portion 45. The hinge shaft 36 may be guided to the second hinge recess 46 along an inclined surface 45a formed in the lower portion of the protrusion fitting portion 45.

The hinge protrusion 33 and the hinge shaft 36 of the auxiliary lever 30 may be coupled in the oblique up and down direction in a sliding manner to the first and second hinge recesses 44 and 46 of the main lever 40.

A prominence and depression structure 49 contacting with a side of the auxiliary lever 30 may be formed within the main lever 40.

Another embodiment is a wiper blade that includes: a wiper strip 10 which wipes a wiping surface; at least one pair of yoke levers 20 which supports the wiper strip 10; a pair of auxiliary levers 30 which is relatively rotatably coupled to the at least one pair of the yoke levers 20 respectively and supports the wiper strip 10; and a main lever 40 which is relatively rotatably coupled to a pair of the auxiliary levers 30 and is connected to a wiper arm. The auxiliary lever 30 further includes a protruding fitting portion 39 which is formed at an end thereof closer to the center of the wiper blade and further includes a first catching protrusion 35 which is formed on the protruding fitting portion 39. At least one pair of the yoke levers 20 includes a pair of first yoke levers 200 which is disposed in the lower portion of the main lever 40. A pair of the first yoke levers 200 includes a first catching recess 21 which is formed on the outside thereof and is coupled to the first catching protrusion 35 and includes a receiving hole 23 which receives the protruding fitting portion 39.

The protruding fitting portion 39 may include a central portion 39a on which the first catching protrusion 35 is formed and a pair of sides 39b. A sliding member 39c may be respectively formed on the outsides of a pair of the sides 39b and contacts with inner surfaces of the first yoke levers 200.

The central portion 39a of the protruding fitting portion 39 may be included of a pair of plates which protrude in parallel with each other and separately from each other at a predetermined interval.

A spoiler 31 may be integrally formed with a portion of a top surface of the auxiliary lever 30, and a protrusion 350 is formed in the lower inside of the spoiler 31. The at least one pair of the yoke levers 20 may include a pair of second yoke levers 201 disposed at an end of the wiper blade. A pair of the second yoke levers 201 may include a catching recess 221 which is formed on the outside thereof and is coupled to the protrusion 350.

Accordingly, an improved wiper blade is disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
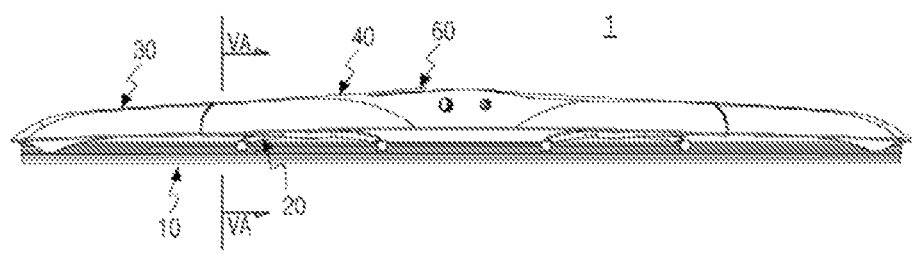
FIG. 1 is a front view of a wiper blade according to the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereafter, exemplary embodiments of the present invention will be described in detail with reference to the accompanying drawings in order that the present invention may be easily implemented by those skilled in the art.

Figure 2:
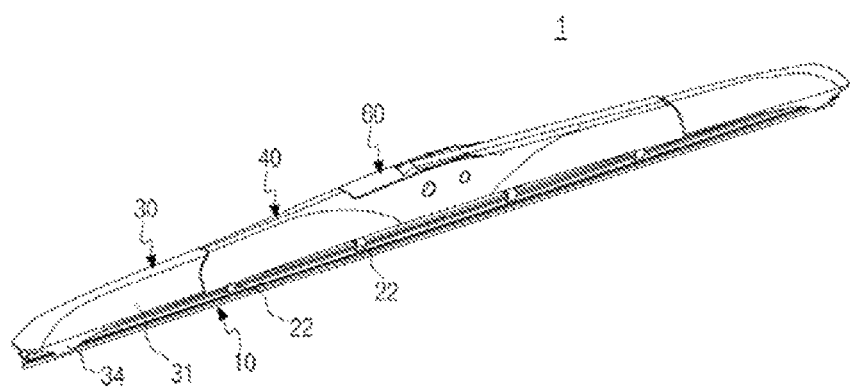
FIG. 2 is a perspective view of a wiper blade assembly according to the present invention.

An overall configuration of a wiper blade assembly according to the present invention FIGS. 1 and 2 are a front view and a perspective view respectively showing an overall configuration of a wiper blade according to the present invention.

Referring to FIGS. 1 and 2, a wiper blade 1 according to the present invention includes a wiper strip 10, a pair of yoke levers 20, a pair of auxiliary levers 30 and a main lever 40.

Hereafter, the wiper blade shown in FIGS. 1 and 2 will be described in detail.

As shown in FIGS. 1 and 2, the wiper blade 1 according to an embodiment of the present invention is connected to an end of a wiper arm and receives a pressing force from the wiper arm in a direction of a glass surface of a vehicle. The wiper arm rotates reciprocatively at a predetermined angle by a wiper motor (not shown). Accordingly, the wiper blade 1 wipes the glass surface (wiping surface) of the vehicle within the predetermined angle.

Figure 3A:
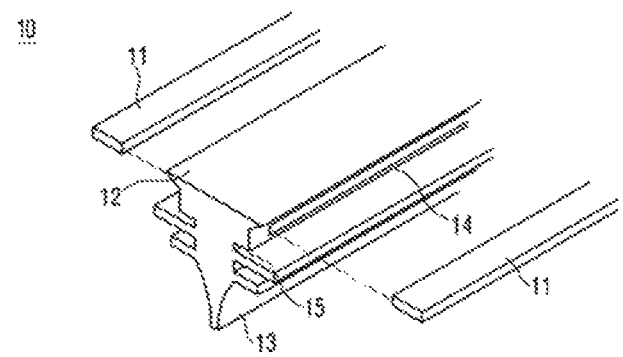
FIG. 3a is a perspective view showing one end of a wiper strip according to the present invention.
Figure 3:
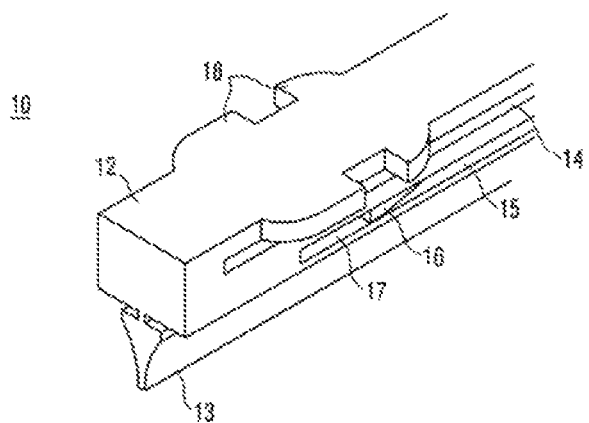
FIG. 3b is a perspective view showing the other end of the wiper strip according to the present invention.

FIGS. 3a and 3b are partial perspective views showing respectively one end and the other end of the wiper strip.

Referring to FIGS. 1, 2, 3a and 3b, the wiper blade 1 further includes two backing plates 11 mounted on the wiper strip 10.

As shown in FIGS. 1, 2, 3a and 3b, the wiper strip 10 includes a wiping lip 13 and a base 12. The wiping lip 13 contacts directly with and wipes the glass surface. The base 12 is supported by the yoke lever 20 and the auxiliary lever 30. The wiper strip 10 is disposed to contact with the glass surface of the vehicle in a sliding manner and removes impurities on the glass surface. The wiper strip 10 extends in a longitudinal direction thereof and is made of either an elastic material like rubber or an elastic composite material.

The base 12 is supported by fasteners of the yoke lever 20 and the auxiliary lever 30. The fasteners may have a yoke shape. The base 12 and the wiping lip 13 continuously extend in a longitudinal direction of the wiper strip 10. A receiving recess 14 in which the two parallel backing plates 11 may be received extends in the base 12 in a longitudinal direction thereof. The two rectangular metallic backing plates 11 having spring characteristics are received in the two backing plate receiving recesses 14 respectively. A holding portion 15 receives the fastener in a sliding manner.

As shown in FIG. 3a, the holding portion 15 located at the one end of the wiper strip 10 is open so as to receive the fastener. However, as shown in FIG. 3b, the other end of the wiper strip is formed to limit the longitudinal movement of the fastener of any one of a pair of the auxiliary levers 30. That is, the fastener supporting the other end is limited by a coupler 17 and a wall of a slope 16 provided only at the other end of the holding portion 15. Also, the longitudinal movement of the fastener is limited by a protrusion 18.

The backing plate 11 applies elasticity and rigidity to the wiping lip 13. When a pressing force is applied from the wiper arm, the pressing force is distributed to the wiper strip 10 through the levers. Here, the pressing force is distributed by the backing plate 11 in the longitudinal direction of the wiper strip 10. Accordingly, the backing plate 11 should have elasticity and rigidity to maintain the shape of the wiper strip 10. A plurality of the backing plates 11 and a plurality of the backing plate receiving recesses 14 may be provided according to the rigidity or elasticity of the wiper strip.

Next, an embodiment of the wiper blade according to the present invention will be described.

The following is a description of one embodiment of the wiper blade according to the present invention.

Figure 4:
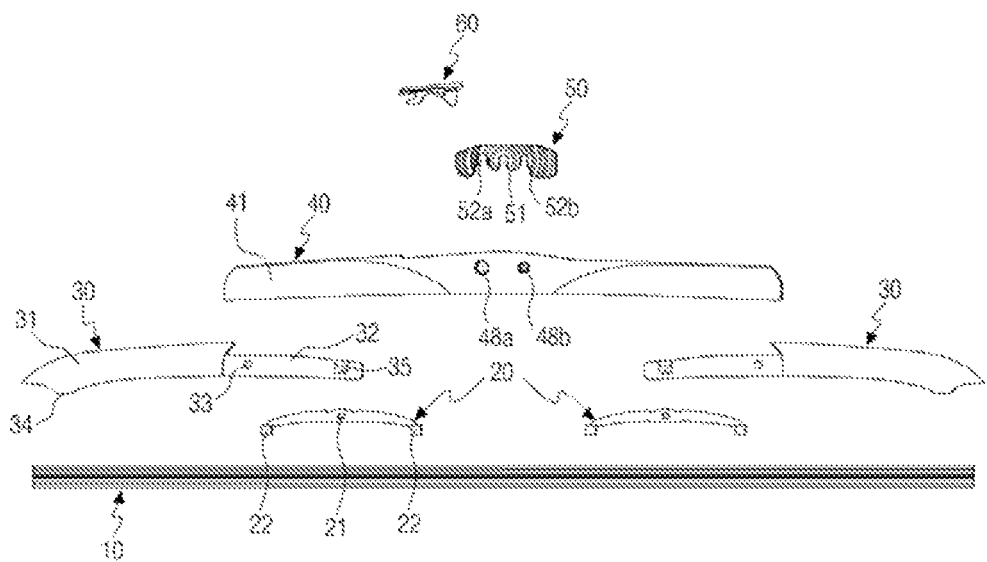
FIG. 4 is an exploded front view of the wiper blade according to the present invention.
Figure 5:
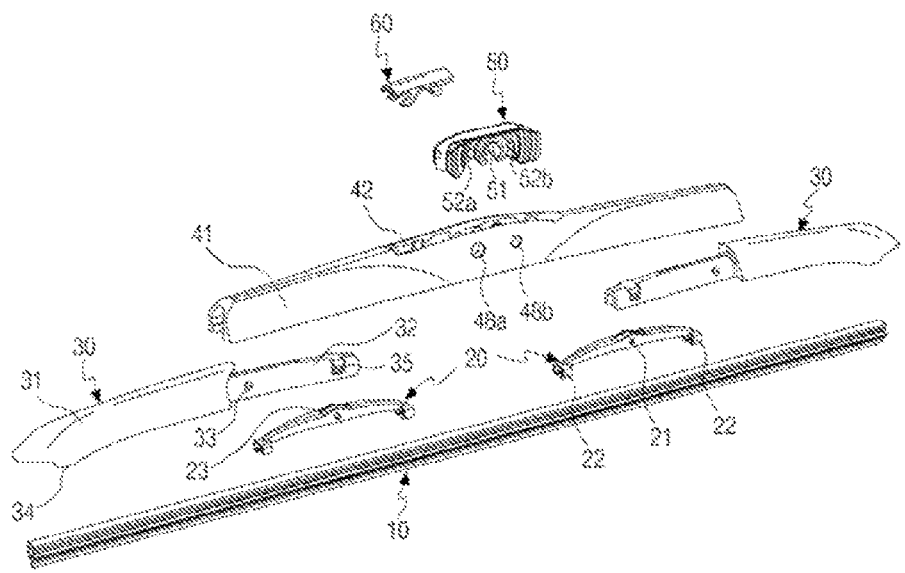
FIG. 5 is an exploded perspective view of the wiper blade according to the present invention.
Figure 6A:
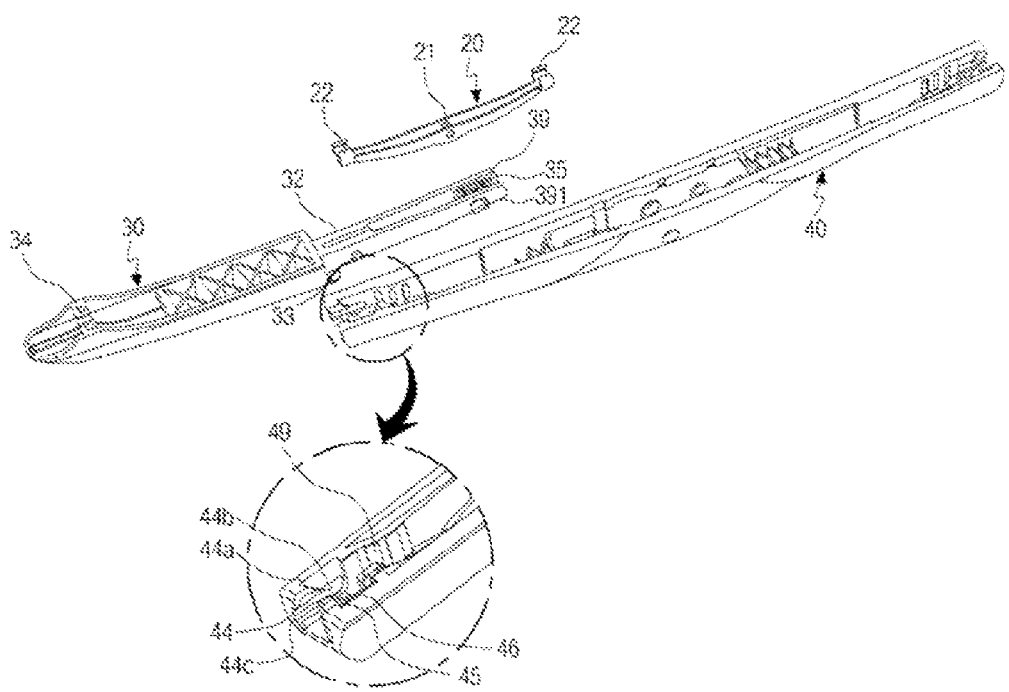
FIGS. 6a to 6c are perspective views showing an auxiliary lever, a yoke lever and a main lever of the wiper blade according to the present invention.
Figure 6:
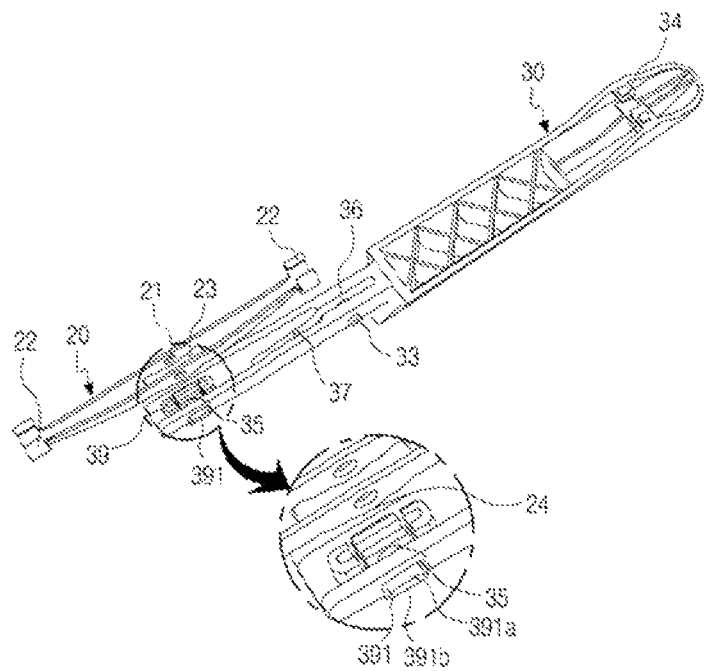
Figure 6:
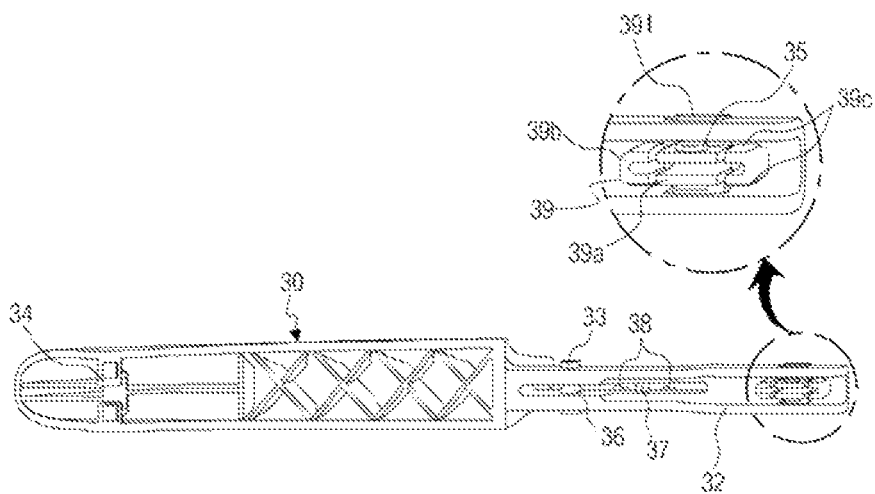

FIGS. 4 and 5 are an exploded front view and an exploded perspective view respectively showing the wiper blade according to an embodiment of the present invention. FIGS. 6a to 6c are exploded perspective views showing the yoke lever, the auxiliary lever and the main lever.

Referring to FIGS. 4 and 5, the main lever 40 applies the pressing force applied from the wiper arm (not shown) to the auxiliary lever 30. The auxiliary lever 30 applies some of the pressing force to the yoke lever 20. The auxiliary lever 30 and the yoke lever 20 press the wiper strip 10, thereby allowing the wiper strip 10 to stably wipe the glass surface of the vehicle.

As shown in FIGS. 4 to 6c, the yoke lever 20 presses the wiper strip 10 and supports the wiper strip 10 in such a manner as to be slidable. The yoke lever 20 includes a catching recess 21, a pair of fasteners 22 and a receiving hole 23. The yoke lever 20 is disposed separately from the end of the wiper strip 10 toward the center of the wiper strip 10. The yoke lever 20 may be made of a resin material and may be manufactured by an injection molding method.

The catching recess 21 of the yoke lever 20 is formed in the side of the yoke lever 20. The catching recess 21 may be formed concave in a direction of the width of the yoke lever 20. A catching protrusion 35 to be described below of the auxiliary lever 30 is coupled to the catching recess 21. The auxiliary lever 30 performs a relative rotation with the yoke lever 20 with an axis of the catching recess 21.

A pair of the fasteners 22 may be formed in both ends of the yoke lever 20. The fastener 22 supports the wiper strip 10 in such a manner as to be slidable.

The receiving hole 23 is formed in the top surface of the yoke lever 20. As shown in FIGS. 4 to 6b, a protruding fitting portion 39 to be described below of the auxiliary lever 30 is inserted and fixed to the receiving hole 23. When the protruding fitting portion 39 of the auxiliary lever 30 is inserted and fixed to the receiving hole 23, a gap between the auxiliary lever 30 and the yoke lever 20 is reduced and torsional flow is prevented when a wiping is performed. The resin-made wiper blade is light and is easy to manufacture but has lower rigidity than that of a metallic wiper blade. In the wiper blade 1 according to the embodiment of the present invention, the protruding fitting portion 39 of the auxiliary lever 30 is inserted and fixed into the receiving hole 23 of the yoke lever 20. As a result, in the wiper blade 1 according to the embodiment of the present invention, when the wiping is performed, a resistance to a bending moment and a torsional moment which are applied to the coupling portion of the two levers is increased. There is also an effect that the gap between the two levers is reduced. In the embodiment of the present invention, a cross section as viewed from the top of the receiving hole 23 has a quadrangular shape. However, the shape of the cross section of the receiving hole 23 is not limited to this.

As shown in FIGS. 4 to 6c, the auxiliary lever 30 transfers the pressing force applied from the main lever 40 to the wiper strip 10 and the yoke lever 20. The auxiliary lever 30 may include a spoiler 31, an extension part 32, a hinge protrusion 33, a fastener 34, the catching protrusion 35, a hinge shaft 36, a rib 37, a receiving hole 38, the protruding fitting portion 39 and a pivot guide 391. The fastener 34 is formed in one end of the auxiliary lever 30 and supports the one end of the wiper strip 10 in such a manner as to be slidable. The catching protrusion 35 is formed in the other end of the auxiliary lever 30 and is coupled to the yoke lever 20 in such a manner as to perform a relative rotation with the yoke lever 20. The auxiliary lever 30 may be made of a resin material and may be manufactured by an injection molding method.

The spoiler 31 is integrally formed with the top surface of a portion of the auxiliary lever 30. The spoiler 31 may be implemented by processing the shape of the top surface of the auxiliary lever 30. When the wiping is performed, the spoiler 31 induces air such that the air flowing toward the glass surface of the vehicle presses the auxiliary lever 30 in a direction closer to the glass surface of the vehicle. The fastener 34 is included at the end of the spoiler 31. The fastener 34 supports the wiper strip 10 in such a manner as to be slidable. The fastener 34 may have a yoke shape.

The extension part 32 is received within the lower portion of the main lever 40 and coupled to the yoke lever 20 in such a manner as to perform a relative rotation with the yoke lever 20. The hinge protrusion 33 is formed on the outer surface of the extension part 32 and functions as a rotational axis at the time of performing a relative rotation with the main lever 40. The hinge shaft 36 is formed within the extension part 32. The hinge protrusion 33 and the hinge shaft 36 are coupled respectively to a first hinge recess 44 and a second hinge recess 46, which are described below, of the main lever 40. Particularly, the hinge protrusion 33 may be tapered such that the degree of protrusion of at least a portion of the hinge protrusion 33 gradually increases or decreases. Therefore, since the hinge protrusion 33 may be in an up and down direction coupled in a sliding manner to the first hinge recess 44 to be described below of the main lever 40, assemblability is improved. Further, the protruding fitting portion 39, catching protrusion 35 and pivot guide 391 are provided at the end of the extension part 32, which is closer to the center of the wiper blade, in other words, at the other end of the auxiliary lever 30.

The protruding fitting portion 39 is formed to protrude downwardly from the inner ceiling of the other end of the auxiliary lever 30. The protruding fitting portion 39 is inserted and fixed to the receiving hole 23, thereby reducing the gap between the auxiliary lever 30 and the yoke lever 20 and preventing torsional flow when the wiping is performed. The protruding fitting portion 39 may include a central portion 39a and a pair of sides 39b. The central portion 39a may be included of a pair of plates which protrudes vertically separately from each other at a predetermined interval. The catching protrusion 35 which is coupled to the catching recess 21 of the yoke lever 20 may be formed on the outside of the central portion 39a. The catching protrusion 35 protrudes from the outside of the central portion 39a in the width direction of the yoke lever 20 in such a manner as to be elastically received in the receiving hole 23 of the yoke lever 20. A pair of the sides 39b may be formed on both sides of the central portion 39a in the longitudinal direction of the wiper blade 1. When the wiper blade 1 is viewed from the bottom, the side 39b may have an arch shape. Since the side 39b is formed to have the arch shape, the resistance to the bending moment or torsional moment of the coupling portion of the auxiliary lever 30 and the yoke lever 20 is increased. Also, a sliding member 39c is respectively formed on a pair of the sides 39b of the protruding fitting portion 39. The sliding member 39c protrudes outwardly from each of the sides 39b and contacts with the inner surface of the yoke lever 20. The sliding member 39c may be formed to have a plate shape in order to increase an effective area contacting with the inner surface of the yoke lever 20. For example, when the protruding fitting portion 39 is inserted and fixed to the receiving hole 23, a total of four sliding members 39c contact with the inner surface of the yoke lever 20. Therefore, when the yoke lever 20 and the auxiliary lever 30 pivot together, the sliding area becomes larger and the resistance to the bending moment and torsional moment which are applied to the coupling portion of the two levers is increased. Further, the gap between the two levers is more effectively reduced. Accordingly, the rigidity and wiping performance of the wiper blade are improved. The yoke lever 20 and the auxiliary lever 30 may be coupled to each other in the up and down direction. Here, the central portion 39a comprised of a pair of the mutually facing plates may be elastically contracted inwardly such that the catching protrusion 35 is coupled to the receiving hole 23. Due to the coupling of the catching protrusion 35 and the receiving hole 23, the catching protrusion 35 and the receiving hole 23 function as an axis of the relative rotation of the yoke lever 20 and the auxiliary lever 30. As such, the yoke lever 20 and the auxiliary lever 30 can be separably and rotatably coupled to each other.

The receiving hole 38 to which a protrusion fitting portion 45 to be described below of the main lever 40 is inserted and fixed may be formed in the upper portion of the extension part 32. When the protrusion fitting portion 45 is inserted and fixed to the receiving hole 38, the gap between the auxiliary lever 30 and the main lever 40 is reduced and the torsional flow is prevented when the wiping is performed. By doing this, the rigidity of the resin-made lever can be enhanced.

The rib 37 is formed in the receiving hole 38 of the extension part 32 and interconnects the mutually facing inner walls of the receiving hole 38. During the process in which the auxiliary lever 30 is manufactured by the injection molding method and cured, the receiving hole 38 may be contracted inwardly. The rib 37 can prevent the contraction of the receiving hole 38. The rib 37 may be received in a rib receiving recess 47 to be described below of the main lever 40.

The pivot guide 391 may be formed on the outside of the other end of the auxiliary lever 30. The pivot guide 391 guides the pivot of the yoke lever 20 when the wiping is performed. The bottom surface 391a of the pivot guide 391 is formed corresponding to a central upper side 24 of the central portion of the yoke lever 20. That is, the bottom surface 391a of the pivot guide 391 is formed overall concave toward the wiper strip 10, and the central upper side 24 of the yoke lever 20, which comes in contact with the pivot guide 391, may be formed upwardly convex. Accordingly, the yoke lever 20 is pivotable within a pivot guide range by the pivot guide 391. Also, the central upper side 24 of the yoke lever 20 may be formed to have an arc shape. The center of curvature of the arc shape is formed to coincide with the center of the catching recess 21. Therefore, the wiper blade according to the embodiment is able to distribute the contact pressure applied to the yoke lever 20. When the yoke lever 20 is coupled to the auxiliary lever 30, the lower portion of the catching protrusion 35 of the auxiliary lever 30 presses the upper portion of the yoke lever 20, and then this pressure is applied to the catching recess 21 of the yoke lever 20. Since this pressure is distributed to the entire yoke lever 20 due to the arc shape of the central upper side 24, it is possible to prevent the shape of the catching protrusion 35 from being transformed or damaged. Also, an outer surface 391b to be described below of the pivot guide 391 may contact with an inner rib 48 formed within the main lever 40. Therefore, there is an effect that the gap between the auxiliary lever 30 and the main lever 40 is reduced.

Figure 7:
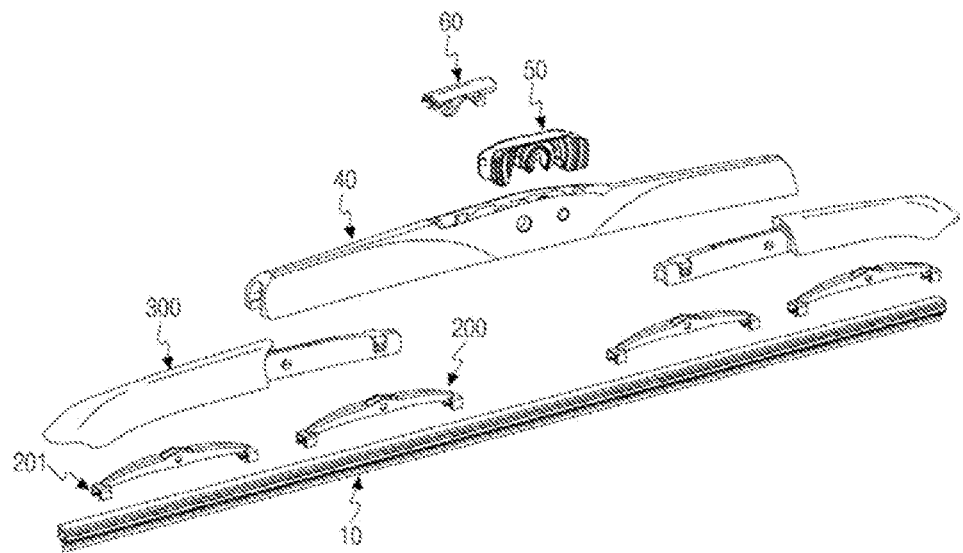
FIGS. 7a to 7c show eight points of the wiper strip in the wiper blade are supported.
Figure 7:
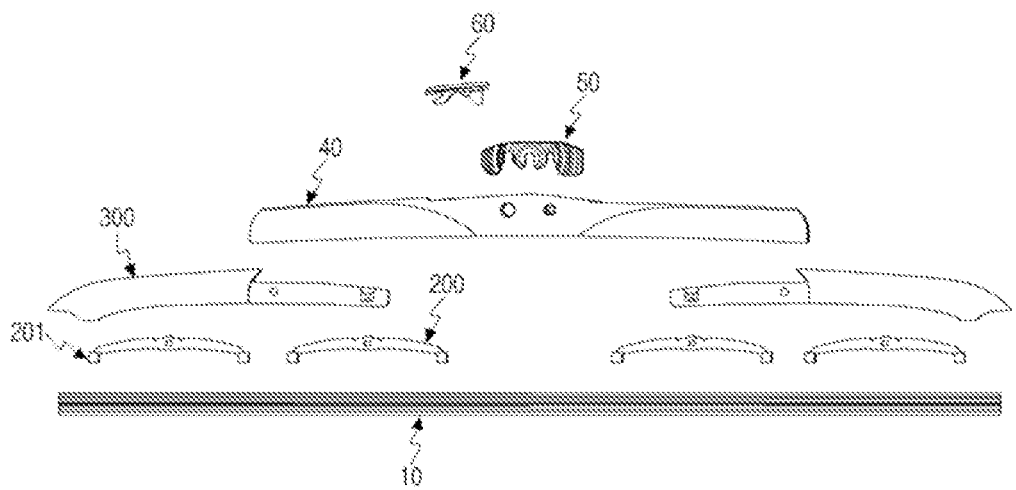
Figure 7:
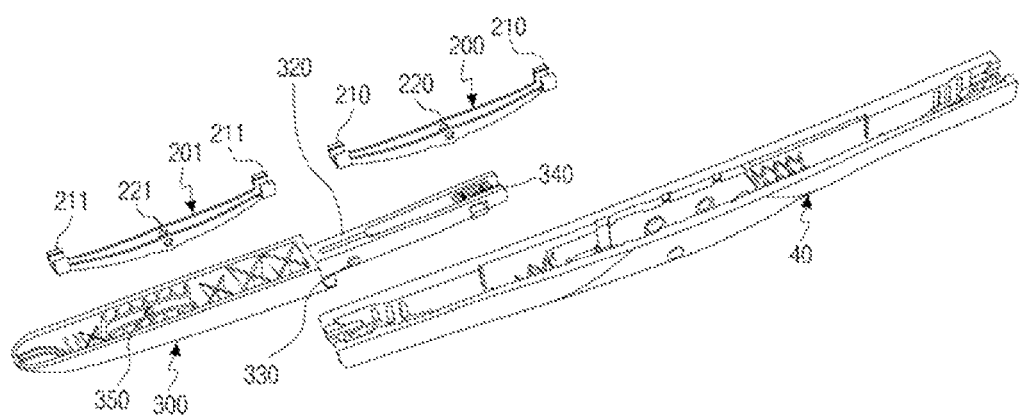

FIGS. 7a and 7b are an exploded perspective view and an exploded front view respectively showing eight points of the wiper strip in the wiper blade are supported. FIG. 7c is an exploded perspective view showing the main lever, the auxiliary lever, a first yoke lever and a second yoke lever.

Referring to FIGS. 7a to 7c, the wiper blade according to the embodiment of the present invention may include a pair of first yoke levers 200 and a pair of second yoke levers 201. That is, the main lever 40 applies the pressing force applied from the wiper arm (not shown) to an auxiliary lever 300, and the auxiliary lever 30 applies the pressing force to the first yoke lever 200 and the second yoke lever 210.

A catching recess 220 of the first yoke lever 200 is formed in the side of the first yoke lever 200. The catching recess 220 may be formed concave in a direction of the width of the first yoke lever 200. A first catching protrusion 340 to be described below of the auxiliary lever 300 is coupled to the catching recess 220.

The lower inside of the spoiler of the auxiliary lever 300 is open to receive the second yoke lever 201. A protrusion 350 to be coupled to the second yoke lever 201 may be formed in the lower inside of the spoiler of the auxiliary lever 300. The protrusion 350 is caught by and coupled to a catching recess 221 formed in the side of the second yoke lever 201. A pair of the first yoke levers 200 and a pair of the second yoke levers 201 support four points of the wiper strip (not shown) respectively, and totally support eight points of the wiper strip. The first and second yoke levers 200 and 201 press the eight points of the wiper strip, thereby allowing the wiper strip to stably wipe the glass surface of the vehicle. In other words, with the increase of the size or curvature of the glass surface of the vehicle, the two pairs of the yoke levers support and press the eight points of the wiper strip. Accordingly, it is possible to more stably and evenly press the wiper strip than the wiper blade having the six-point support structure.

Figure 8:
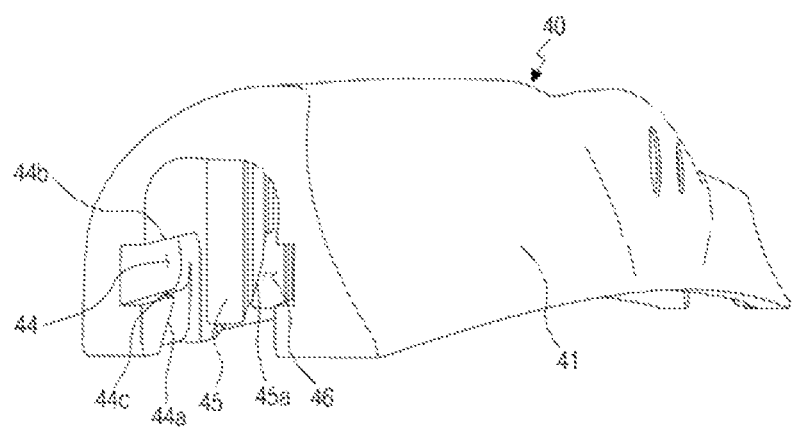
FIG. 8 is a cross sectional view of FIG. 1 taken along line $V_A$.

FIG. 8 is a cross sectional view of the wiper blade shown in FIG. 1 taken along line $V_A$.

FIG. 9a shows the main lever cut in the longitudinal direction of the wiper blade and the auxiliary lever. FIG. 9b is a partial enlarged view of FIG. 9a.

Referring to FIGS. 4 to 9b, both ends of the main lever 40 are connected a pair of the auxiliary levers 30. The main lever 40 applies the pressing force applied from the wiper arm (not shown) to the auxiliary lever 30. The main lever 40 may include a spoiler 41, an arm coupling hole 42, a central shaft 43, the first hinge recess 44, the catching recess 45, the second hinge recess 46, the rib receiving recess 47, the inner rib 48 and a prominence and depression structure 49. The main lever 40 may be made of a resin material and may be manufactured by an injection molding method.

The spoiler 41 is integrally formed with the top surface of the main lever 40. The spoiler 41 may be implemented by processing the shape of the top surface of the main lever 40. When the wiping is performed, the spoiler 41 induces air such that the air flowing toward the glass surface of the vehicle presses the main lever 40 in a direction closer to the glass surface of the vehicle.

The arm coupling hole 42 to which the wiper arm (not shown) is coupled is formed in the longitudinal central portion of the main lever 40. The central shaft 43 traversing the arm coupling hole 42 in the width direction of the arm coupling hole 42 is formed in the arm coupling hole 42. An adaptor 50 which is directly connected to the wiper arm (not shown) is assembled to the central shaft 43. Meanwhile, a cover member 60 may be coupled to the arm coupling hole 42. Coupling holes 48a and 48b to which a pin-type wiper arm may be coupled may be formed on the outside of the main lever 40.

Hereafter, a coupling relation between the main lever and the auxiliary lever will be described.

Figure 9:
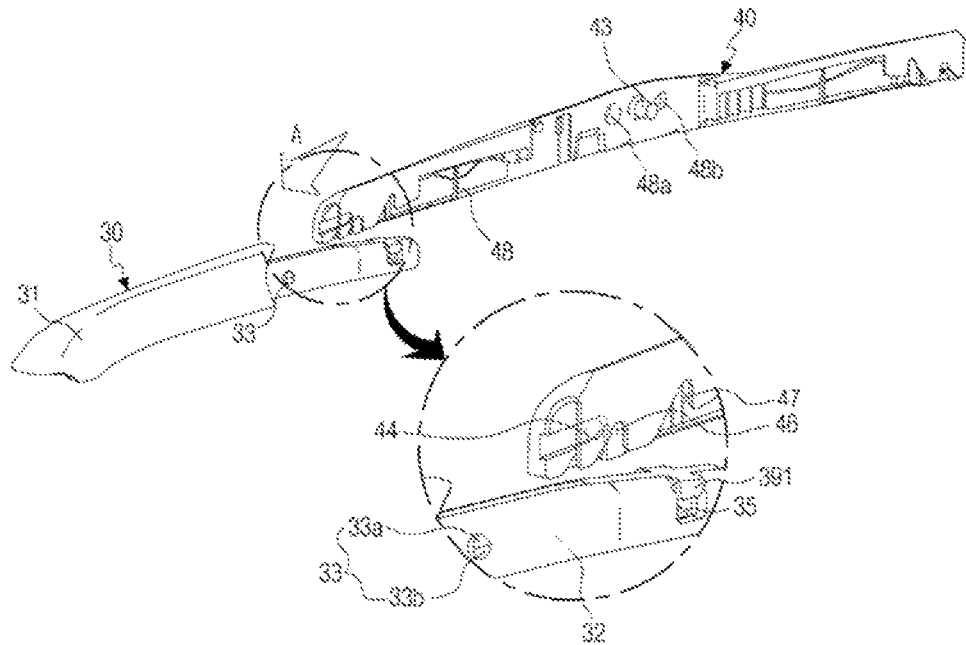
FIG. 9a is a perspective view showing how the main lever is coupled to the auxiliary lever in accordance with the present invention.
FIG. 9b is a partial enlarged view of the main lever and auxiliary lever according to the present invention.
Figure 9:
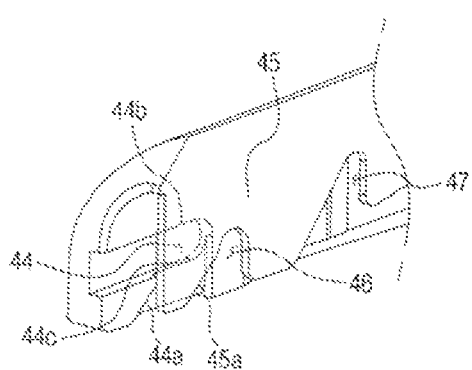

Referring to FIGS. 8 to 9*b*, the bottom surface of the main lever 40 is open and is able to receive the extension part 32 of the auxiliary lever 30. Both ends of the main lever 40 are able to perform a relative rotation with the auxiliary lever 30 and are separably coupled to the auxiliary lever 30. Specifically, the first and second hinge recesses 44 and 46 may be formed in the main lever 40. The hinge protrusion 33 and the hinge shaft 36 of the auxiliary lever 30 may be coupled in an oblique up and down direction in a sliding manner to the first and second hinge recesses 44 and 46.

As shown in FIGS. 1 to 9*b*, the end of the main lever 40 of the wiper blade 1 of the present invention may be formed to have a convex circular shape toward the end of the wiper blade 1. The end of the spoiler 31 of the auxiliary lever 30, which is closer to the main lever 40, may be formed to have a concave circular shape toward the end of the wiper blade 1. The center of the curvature of at least a portion of the circular end of the main lever 40 is the same as that of at least a portion of the circular end of the spoiler 31 of the auxiliary lever 30. Also, the centers of the curvature of the two circular ends may coincide with the hinge protrusion 33 and the hinge shaft 36. Therefore, when the main lever 40 and the auxiliary lever 30 are coupled to each other in the up and down direction perpendicular to the longitudinal direction of the wiper blade 1, the upper end of the spoiler 31 of the auxiliary lever 30 causes interference with the lower end of the main lever 40. Accordingly, in the wiper blade 1 of the present invention, the auxiliary lever 30 and the main lever 40 are coupled to each other in the oblique up and down direction in a sliding manner. For this purpose, the hinge protrusion 33 of the auxiliary lever 30 is guided by a guide part 44*a* formed under the first hinge recess 44 and is coupled to the first hinge recess 44. The hinge shaft 36 is guided by an inclined surface 45*a* of the protrusion fitting portion 45 and is coupled to the second hinge recess 46.

As shown in FIGS. 4 to 9*b*, when the hinge protrusion 33 is viewed in the direction of the wind blowing to the wiper blade 1, the hinge protrusion 33 may be formed such that the degree of protrusion of a hemispheric lower protrusion 33*b* is constant and the degree of protrusion of a hemispheric upper protrusion 33*a* gradually decreases toward the top thereof.

The first hinge recess 44 may be formed on the side wall of the inner circumferential surface of the main lever 40. When the main lever 40 slides with the auxiliary lever 30 in a direction of "A", the hinge protrusion 33 is coupled to the first hinge recess 44. The guide part 44*a* may be formed on the side wall of the inner circumferential surface of the main lever 40 in order that the hinge protrusion 33 is coupled to the first hinge recess 44 in the oblique up and down direction. When the hinge protrusion 33 slides along the guide part 44*a*, the lower protrusion 33*b* of the hinge protrusion 33 is caught by the upper catching portion 44*b* of the first hinge recess 44 simultaneously when the hinge protrusion 33 is seated and coupled to the first hinge recess 44. More specifically, when the hinge protrusion 33 is received and coupled to the first hinge recess 44, the upper protrusion 33*a* and the lower protrusion 33*b* of the hinge protrusion 33 are caught by the upper catching portion 44*b* and the lower catching portion 44*c* surrounding the first hinge recess 44. As a result, the hinge protrusion 33 is caught by the first hinge recess 44, so that the upward and downward movement of the hinge protrusion 33 is limited.

The hinge shaft 36 is coupled to the second hinge recess 46 as well as the hinge protrusion 33 is coupled to the first hinge recess 44. The second hinge recess 46 may be formed in the center in the width direction of the main lever 40. Specifically, a protrusion formed toward the receiving hole 38 and a concave part toward the receiving hole 38 are formed on the protrusion fitting portion 45. The second hinge recess 46 may be formed in the concave part of the protrusion fitting portion 45. The hinge shaft 36 is guided along the inclined surface 45*a* formed obliquely in the lower portion of the protrusion fitting portion 45 and is coupled to the second hinge recess 46. When the hinge shaft 36 is coupled to the second hinge recess 46, the longitudinal movement of the wiper blade 1 is limited by the second hinge recess 46 to which the hinge shaft 36 has been coupled and of which only the lower portion is open.

As described above, the hinge protrusion 33 and the hinge shaft 36 of the yoke lever 30 are coupled in the oblique up and down direction in a sliding manner to the first hinge recess 44 and the second hinge recess 46 of the main lever 40. Specifically, the hinge protrusion 33 and the hinge shaft 36 may be coupled at an angle of about 45 degree to the first hinge recess 44 and the second hinge recess 46. Therefore, without a separate member of a spacer that is inserted between the main lever 40 and the auxiliary lever 30 for the coupling of the two levers, the two levers can be simply assembled in a sliding manner. The hinge protrusion 33 and the hinge shaft 36 function as an axis of the relative rotation of the main lever 40 and the auxiliary lever 30. Further, the hinge protrusion 33 is caught and received in the upper catching portion 44*b* and the lower catching portion 44*c* of the first hinge recess 44, so that the upward and downward movement of the hinge protrusion 33 is limited. The hinge shaft 36 is received in the second hinge recess 46 of which only the lower portion is open, so that the longitudinal movement of the wiper blade is limited. Accordingly, without using the spacer, it is possible to efficiently prevent the main lever 40 and the auxiliary lever 30 from being separated from each other.

Meanwhile, when the hinge protrusion 33 and the hinge shaft 36 are coupled to the first and second hinge recesses 44 and 46, the rib 37 of the auxiliary lever 30 is received in the rib receiving recess 47 of the main lever 40, and the protrusion fitting portion 45 is inserted and fixed to the receiving hole 38. When the auxiliary lever 30 and the main lever 40 are coupled to each other, the protrusion fitting portion 45 is able to improve the resistance to the bending moment and torsional moment which are applied between the two levers when the wiper blade 1 pivots.

Also, when the auxiliary lever 30 and the main lever 40 are coupled to each other, the inner rib 48 of the main lever 40 comes in contact with the pivot guide 391. When the inner rib 48 contacts with the pivot guide 391, the gap between the main lever 40 and the auxiliary lever 30 can be reduced.

When the main lever 40 slides in the direction of "A", the hinge protrusion 33 is coupled to the first hinge recess 44, and the hinge shaft 36 is coupled to the second hinge recess 46. Here, the protrusion fitting portion 45 is inserted and fixed to the receiving hole 38 of the auxiliary lever 30, and the rib receiving recess 47 formed in the middle of the protrusion fitting portion 45 receives the rib 37 of the auxiliary lever 30.

Also, as shown in FIG. 6*b*, the prominence and depression structure 49 may be formed in at least a portion of the inside of the main lever 40. The prominence and depression structure 49 is able to reduce the gap between the main lever 40 and the auxiliary lever 30 which is received in the main lever 40.

As a result, the wiper blade 1 according to the embodiment of the present invention includes the one main lever 40, a pair of the auxiliary levers 30 and a pair of the yoke levers 20. Each lever is made of a resin material.

According to the embodiment of the present invention, the levers which may be generally made of a metallic material are made of a resin material, thereby reducing the total weight of the wiper blade 1.

When the levers are made of a resin material instead of a metallic material, the product can be integrally molded, and then the number of parts can be reduced. Accordingly, the process becomes simpler and manufacturing cost is reduced.

Particularly, without a separate member of the spacer that is inserted between the main lever 40 and the auxiliary lever 30, the wiper blade is assembled by using the recess and the catching structure of the protrusion. As a result, the number of the parts can be reduced and the wiper blade can be more simply assembled.

Also, since the levers are made of a resin material, the flexibility of the external appearance of the wiper blade 1 can be increased.

According to the embodiment of the present invention, when the levers are coupled, the protruding fitting portions 39 and 45 are inserted and fixed to the receiving holes 23 and 38, so that the gap between the levers is prevented from being created and the resistance to the bending moment and torsional moment which are applied to the lever when the wiping is performed is increased.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A wiper blade comprising:
a wiper strip which wipes a wiping surface;
at least one pair of yoke levers which supports the wiper strip;
a pair of auxiliary levers which is relatively rotatably coupled to the at least one pair of the yoke levers respectively; and
a main lever which is relatively rotatably coupled to the pair of the auxiliary levers and is connected to a wiper arm,
wherein each of the pair of the auxiliary levers comprises a spoiler and an extension part which is received within a lower portion of the main lever,
wherein the extension part comprises a hinge protrusion which protrudes outwardly therefrom in a width direction thereof and a hinge shaft which protrudes inwardly,
wherein the main lever comprises a protrusion fitting portion, a first hinge recess, a second hinge recess, a guide part and an inclined surface,
wherein the protrusion fitting portion is formed to protrude downwardly from an inner ceiling,
wherein the first hinge recess is formed on an inner side wall of an end of the main lever and wherein the hinge protrusion is coupled to the first hinge recess,
wherein the second hinge recess is formed in the protrusion fitting portion and is formed in a center in a width direction of the main lever and wherein the hinge shaft is coupled to the second hinge recess,
wherein the guide part is formed on the inner side wall of the main lever, and is formed under the first hinge recess and is inclined toward the end of the main lever,
wherein the inclined surface is formed in the lower portion of the protrusion fitting portion and is formed under the second hinge recess and is inclined toward the end of the main lever,
wherein the lower portion of the end of the main lever is formed to have a convex shape toward the end of the wiper blade,
wherein the lower portion of the end of the spoiler of the auxiliary lever, which is closer to the main lever, is formed to have a concave shape toward the end of the wiper blade,
wherein the hinge protrusion is guided by the guided part and is coupled in an oblique up and down direction in a sliding manner to the first hinge recess, and
wherein the hinge shaft is guided by the inclined surface and is coupled in an oblique up and down direction in a sliding manner to the second hinge recess.

2. The wiper blade of claim 1, wherein the hinge protrusion is tapered such that degree of protrusion the hinge protrusion from the auxiliary lever gradually increases or decreases.

3. The wiper blade of claim 2, wherein, when the hinge protrusion is viewed in a direction in which traveling wind blows to the wiper blade, the hinge protrusion comprises a hemispheric upper protrusion and a hemispheric lower protrusion, and wherein a degree of protrusion of the upper protrusion gradually decreases toward the top from the bottom thereof.

4. The wiper blade of claim 3, wherein the first hinge recess comprises an upper catching portion by which the upper protrusion is caught and a lower catching portion by which the lower protrusion is caught.

5. The wiper blade of claim 1, wherein the auxiliary lever further comprises a receiving hole which is formed in the upper portion thereof and by which the protrusion fitting portion is caught.

6. The wiper blade of claim 5, wherein the protrusion fitting portion comprises a protrusion formed toward the receiving hole and a concave part toward the receiving hole, wherein the second hinge recess is formed in the concave part of the protrusion fitting portion.

7. The wiper blade of claim 1, wherein a prominence and depression structure contacting with a side of the auxiliary lever is formed within the main lever.

8. A wiper blade comprising:
a wiper strip;
at least one pair of yoke levers supporting the wiper strip;
a pair of auxiliary levers coupled to the at least one pair of the yoke levers; and
a main lever coupled to the pair of the auxiliary levers, wherein each of the pair of the auxiliary levers comprises a spoiler and an extension part received within a lower portion of the main lever, wherein the extension part comprises a hinge protrusion which protrudes outwardly therefrom in a width direction thereof and a hinge shaft which protrudes inwardly, wherein the main lever comprises a protrusion fitting portion, a first hinge recess, a second hinge recess, a guide part and an inclined surface, wherein the protrusion fitting portion is formed to protrude downwardly from an inner ceiling, wherein the first hinge recess is formed on an inner side wall of an end of the main lever and wherein the hinge protrusion is coupled to the first hinge recess, wherein the second hinge recess is formed in the protrusion fitting portion and is formed in a center in a width direction of the main lever and wherein the hinge shaft is coupled to the second hinge recess, wherein the guide part is formed on the inner side wall of the main lever, and is formed under the first hinge recess and is inclined toward the end of the main lever, wherein the inclined surface is formed in the lower portion of the protrusion fitting portion and is formed under the second hinge recess and is inclined toward the end of the main lever, wherein the lower portion of the end of the main lever is formed to have a convex shape toward the end of the wiper blade, wherein the lower portion of the end of the spoiler of the auxiliary lever is formed to have a concave shape toward the end of the wiper blade, wherein the hinge protrusion is guided by the guided part and is coupled in an oblique up and down direction in a sliding manner to the first hinge recess, and wherein the hinge shaft is guided by the inclined surface and is coupled in an oblique up and down direction in a sliding manner to the second hinge recess.

* * * * *